United States Patent [19]
Suzuki et al.

[11] Patent Number: 6,031,957
[45] Date of Patent: Feb. 29, 2000

[54] GLASS WAVE GUIDE ELEMENT AND METHOD OF MANUFACTURING THE SAME

[75] Inventors: Ryoji Suzuki, Mito; Hisato Uetsuka, Hitachi; Dai Kobayashi, Hitachi; Hideaki Arai, Hitachi; Korenori Tamura, Hitachi, all of Japan

[73] Assignee: Hitachi Cable Ltd., Tokyo, Japan

[21] Appl. No.: 09/082,524

[22] Filed: May 21, 1998

[30] Foreign Application Priority Data

Oct. 7, 1997 [JP] Japan ..................................... 9-274457

[51] Int. Cl.[7] ...................................................... G02B 6/10
[52] U.S. Cl. .......................... 385/129; 385/131; 385/123; 385/37; 65/385
[58] Field of Search ..................................... 385/129–132, 385/122–128, 141–145, 37; 356/32; 65/385

[56] References Cited

U.S. PATENT DOCUMENTS

| | | | |
|---|---|---|---|
| 5,467,415 | 11/1995 | Presby | 385/14 |
| 5,627,933 | 5/1997 | Ito et al. | 385/123 |
| 5,770,155 | 6/1998 | Dunphy et al. | 356/32 X |
| 5,903,697 | 5/1999 | Yamada et al. | 385/129 |

*Primary Examiner*—Phan T. H. Palmer
*Attorney, Agent, or Firm*—Antonelli, Terry, Stout & Kraus, LLP

[57] ABSTRACT

A glass wave guide element, which is small in size and amenable to integration and mass-production, and a method of manufacturing the glass wave guide element are provided. The glass wave guide element includes a core 3 having a diffraction grating formed on an under cladding 2, an over cladding 4 covering the core 3 and a heater 6 for changing the Bragg wavelength of the diffraction grating, the heater being arranged on the over cladding 4. The core 3 and a central portion (2B, 4B) of both claddings in a surrounding portion around the core 3 are formed in a state of being continuously separated along a longitudinal direction of the core 3 from the substrate 1 through a gap 5, and the core 3 and the surrounding portion around the core 3 are formed in a state of being spatially intermittently separated in a width direction of the core 3 from a surrounding portion (2A, 2C, 4A, 4C) of both claddings through a gap.

4 Claims, 2 Drawing Sheets

GLASS WAVE GUIDE ELEMENT AND METHOD OF MANUFACTURING THE SAME

BACKGROUND OF THE INVENTION

The present invention relates to a glass wave guide element and a method of manufacturing the glass wave guide element.

In recent years, with development of optical communication technology, wavelength divisional multiplexing (WDM) communications have been employed. In order to separate wavelength multiplexed light transmitted inside an optical fiber, a communication of this kind requires an element which can select whether light having a certain wavelength is allowed to pass through or should be reflected by the element.

In regard to elements of this kind, there is an element which can select whether light having a certain wavelength is allowed to pass through or should be reflected by the element. In such an element, an ultraviolet light is irradiated onto a wave guide, having an optical fiber with germanium added thereto, to form a diffraction grating along the light transmission direction in the fiber by inducing refractive index change. Further, the Bragg wavelength is changed by changing the temperature of the diffraction grating by heating the wave guide using a heater.

However, a conventional wave guide element using an optical fiber is high in cost because the manufacturing process to mount a heater or the like thereon is complex. Further, the conventional wave guide element is essentially unsuitable for accommodating a reduction in size and an increase of integration. Further, the multiplicity of wavelength divisional multiplexing communications is being increased to 16 channels, and 32 channels in the future, and so the conventional wave guide element is unable to cope with the increasing multiplicity of channels from the viewpoint of cost and productivity.

SUMMARY OF THE INVENTION

An object of the present invention is to provide a glass wave guide element which is small in size, and amenable to integration and mass-production, and to a method of manufacturing the glass wave guide element by solving the above-mentioned problems.

The above object can be attained by providing a glass wave guide element comprising a substrate; an under cladding formed on the substrate; a core having a diffraction grating having a spatially periodically changing refractive index along a light transmission direction, the core being formed on the under cladding; an over cladding covering the core; and a heater for changing the Bragg wavelength of the diffraction grating, the heater being arranged in the over cladding, wherein the core and a central portion of both claddings in a surrounding portion around the core are formed in a state of being continuously separated along a longitudinal direction of the core from the substrate through a gap, and the core and the surrounding portion around the core are formed in a state of being separated in a width direction of the core from a surrounding portion of both claddings through a gap.

In addition to the above construction, it is preferable that the glass wave guide element in accordance with the present invention comprises a heater formed of a metallic laminated film for changing the temperature of the core, the heater being formed along the core on an upper surface of the over cladding in the inside portion surrounded by the gaps; and an opening for irradiating ultraviolet light to produce a spatially periodic change of refractive index in the core, the opening being formed in a central portion of the heater.

In addition to the above construction, it is preferable that the heater in the glass wave guide element in accordance with the present invention is formed by a titanium film formed on the over cladding and a platinum film formed on the titanium film.

In addition to the above construction, it is preferable that the heater in the glass wave guide element in accordance with the present invention is formed such that a pad zone of the heater to be wire-bonded is a three-layer film formed of titanium, platinum and gold, and a heating zone of the heater is a two-layer film formed of titanium and platinum.

A method of manufacturing a glass wave guide element in accordance with the present invention comprises the steps of forming a thin film on a substrate; forming a terrace by adjusting the thin film to a desired optical path to perform patterning; successively forming an under cladding, a core and an over cladding on the terrace; then spatially intermittently forming gaps in both sides of the core along said core to a depth reaching the terrace; and forming a diffraction grating having a spatially periodic changing refractive index along a transmitting direction of light in the core by continuously removing the terrace along a longitudinal direction of the core by inserting a substance capable of etching the terrace from the gaps.

In addition to the above method, it is preferable that, in the method of manufacturing a glass wave guide element in accordance with the present invention, the thin film is formed of silicon.

In addition to the above method, it is preferable that, in the method of manufacturing a glass wave guide element in accordance with the present invention, a pit formed by the gaps penetrating through the over cladding and the under cladding is used as a flow pass of the etching substance for removing the thin film during manufacturing, which functions as a heat insulating structure for preventing heat dissipation to a surrounding portion in a lateral direction of the core after completion.

In addition to the above method, it is preferable that the method of manufacturing a glass wave guide element in accordance with the present invention further comprises the steps of forming a heater for changing the temperature of said core along the core on an upper surface of the over cladding in the inside portion surrounded by the gaps, the heater being formed of a metallic laminated film; and forming an opening for irradiating ultraviolet light to produce a spatially periodic change of refractive index in the core in a central portion of the heater.

In addition to the above method, it is preferable that, in the method of manufacturing a glass wave guide element in accordance with the present invention, the heater is formed by forming a titanium film on the over cladding and then forming a platinum film on the titanium film.

In addition to the above method, it is preferable that, in the method of manufacturing a glass wave guide element in accordance with the present invention, the heater is formed by forming a three-layer film of titanium, platinum and gold through any one of a method of etching and a lift-off method, and a pad zone for performing wire-bonding is formed as a three-layer film by leaving the three-layer film as it is and a heater zone as formed in a two-layer film by removing only the gold film portion.

BRIEF DESCRIPTION OF THE DRAWINGS

These and other objects, features and advantages of the present invention will be understood more clearly from the following detailed description when considered with reference to the accompanying drawings, wherein.

DESCRIPTION OF THE PREFERRED EMBODIMENTS

An embodiment of the present invention will be described in detail below with reference to the accompanied drawings.

Figure 1:
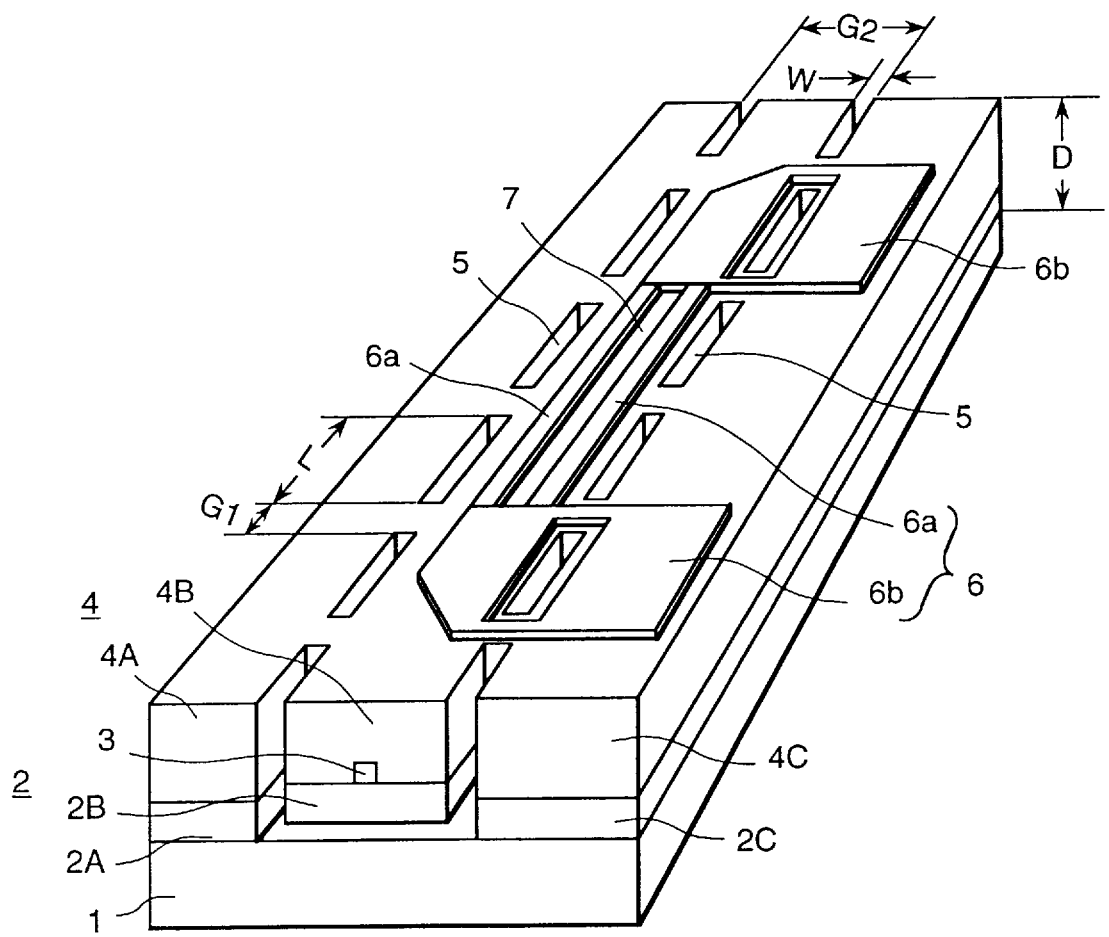
FIG. 1 is a schematic perspective view showing an embodiment of a glass wave guide element in accordance with the present invention.

FIG. 1 is a schematic perspective view showing an embodiment of a glass wave guide element in accordance with the present invention. Explanation thereof will be made using numerical values, but the invention is not limited to the recited values.

An under cladding 2 (2A, 2B, 2C) is formed on a quartz substrate 1, and a core 3 is provided having a diffraction grating with a spatially periodic changing refractive index along the direction of the transmitted light. The core 3 is covered with an over cladding 4 (4A, 4B, 4C). There is formed a gap (pit) 5 having a U-shaped cross-section by which the core 3 and a central portion (2B, 2C) of both claddings surrounding the core are spatially intermittently separated from the quartz substrate 1 and the surrounding portion (2A, 2C, 4A, 4C) of both claddings.

The gap 5 having a U-shaped cross-section is formed spatially and intermittently. However, between the under cladding 2B and the quartz substrate 1, under the core 3, the gap 5 extends over the total length in the longitudinal direction of the glass wave guide element. The gap 5 is formed by a method to be described later.

At a position on the over cladding 4 corresponding to the core 3, a heater 6 for changing the Bragg wavelength of the diffraction grating is provided. Between portions 6a, 6a in the central portion of the heater 6, there is formed an opening 7 for irradiating ultraviolet light to produce a spatially periodic change of refractive index in the core 3. The reference character 6b indicates a pad zone for applying a voltage to the heater 6.

As an example, the width W of the pit 5 is approximately 20 $\mu$m, the length L is approximately 3.3 mm, the depth D is approximately 40.5 $\mu$m, and the gap $G_1$ in the longitudinal direction of the pit 5 is approximately 0.2 $\mu$m, the gap $G_2$ in the longitudinal direction of the pit 5 is approximately 130 $\mu$m.

The core 3 and the central portion (2B, 4B) of both claddings are separated from the substrate 1 and the surrounding portion (2A, 2C, 4A, 4C) of both claddings through the gap 5, which gap 5 functions as a heat insulator. Since dissipation of heat is suppressed by the gap 5, the heat of the heater 6 is effectively used in the temperature control of the core 3. Therefore, the element can be made small in size, and the degree of integration of the element can be increased.

Description will be made below of a method of manufacturing the glass wave guide element shown in FIG. 1.

Figure 2:
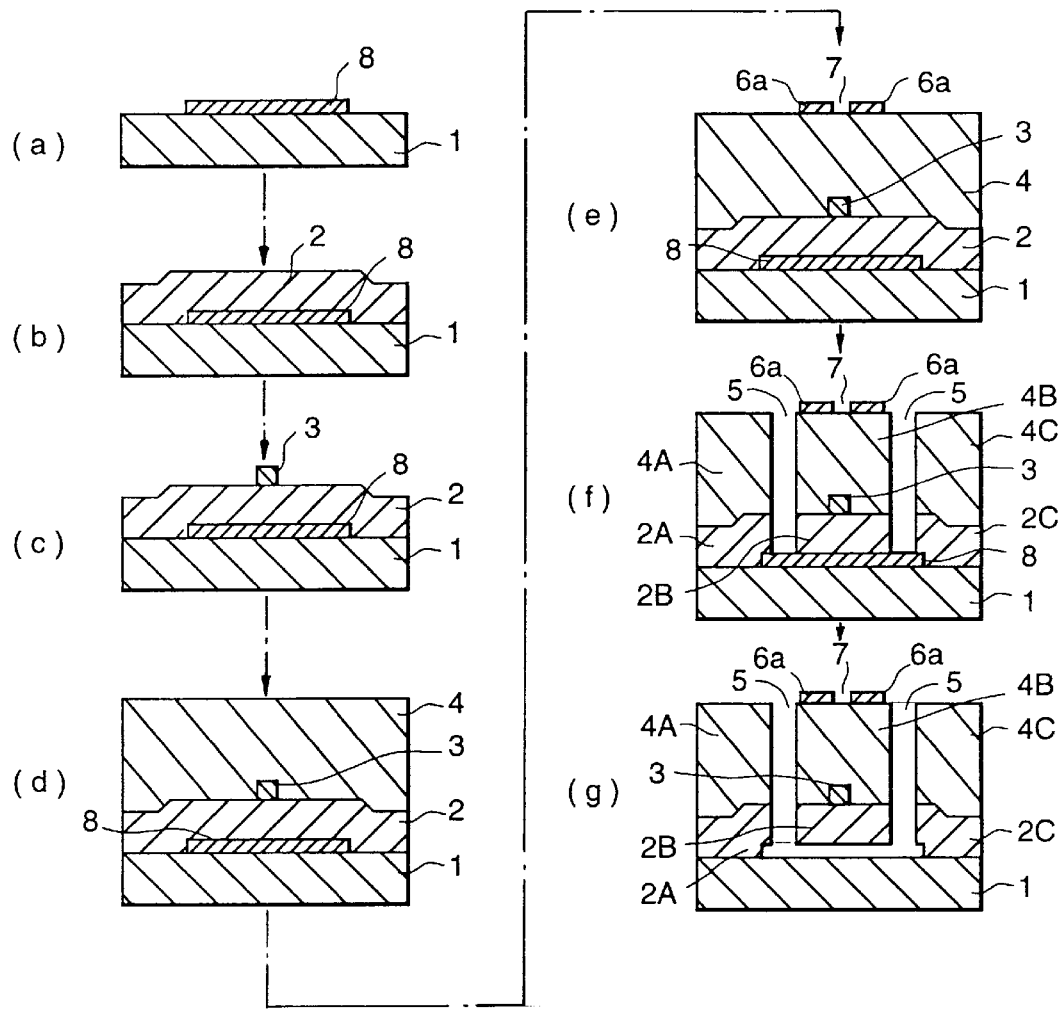
FIG. 2 is a process diagram, illustrating steps (a) to (g) in a method of manufacturing the glass wave guide element shown in FIG. 1.

FIG. 2 is a process diagram, illustrating steps (a) to (g) of a method of manufacturing the glass wave guide element shown in FIG. 1.

A silicon thin film 8 having a thickness of approximately 2.5 $\mu$m is formed all over the surface of the quartz substrate 1 by a sputtering method (not shown in the figure). The silicone thin film 8 is patterned by photo-lithography as a silicon terrace 8 (FIG. 2 at step (a)).

A quartz under cladding 2 having a thickness of approximately 8 $\mu$m is formed using plasma CVD (FIG. 2 at step (b)).

A germanium added core film having a thickness of approximately 6 $\mu$m is formed all over the surface of the under cladding 2 using a sputtering method (not shown in the figure), and a core (light path) 3 is formed by lithography (FIG. 2 at step (c)).

An over cladding 4 is formed having a thickness of 30 $\mu$m by a frame accumulating method (FIG. 2 at step (d)).

A heater 6 composed of three layers, including a titanium layer having a thickness of approximately 0.1 $\mu$m, a platinum layer having a thickness of approximately 0.5 $\mu$m and a gold layer having a thickness of approximately 0.5 $\mu$m, is formed by lithography. However, a heating zone 6a is formed in a two-layer structure by removing the gold layer by etching (FIG. 2 at step (e)). An opening 7 is formed in the middle portion of the heating zone 6 (between 6a, 6a).

Next, pits 5 are formed in both sides of the heater 6 by etching. The etching of the pits 5 is performed so as to reach the silicon terrace 8 (FIG. 2 at step (f)). By the pits 5, both claddings 2, 4 are separated into a central portion (2B, 4B) and surrounding portions (2A, 2C, 4A, 4C). Both claddings 2, 4 are continued in the width direction at positions where the pits 5 are not formed.

Then, all of the silicon terrace 8 is removed over the total length in the longitudinal direction of the glass wave guide element by etching (FIG. 2 at step (g)). That is, an etching substance for removing the silicon terrace 8 is introduced through the pits 5 to remove all the silicon terrace 8.

Many glass wave guide elements are formed on a quartz substrate at one time through the method as described above, and they are then diced and separated into respective elements. Then, a Bragg grating is formed in the core 3 by an irradiating exciter laser to obtain a glass wave guide element as shown in FIG. 1.

In order to check the characteristics of the element manufactured by the method according to the present invention, the Bragg wavelength shift was confirmed by conducting current to the heater 6. For example, the wavelength shift was 0.4 nm toward the long wavelength side at a heater current of 80 mA. This characteristic is equivalent to that of the conventional element.

The reason why silicon is used as the thin film material is that silicon has a good compatibility with a quartz material, an easiness in film forming, a high heat resistance, and a comparatively easy and safe etching selectivity to quartz in the manufacturing process.

Chromium is generally used as a heater material, but chromium cannot be used since ultraviolet light, that is, exciter laser light is irradiated after the heater is formed. Platinum was selected on the basis of its being a high melting-point metal capable of withstanding the laser irradiation, a less reactive and stable metal, particularly a metal resistant to oxidizing, and a metal having an electric resistivity capable of being used as a heater material. It has been confirmed by tests and evaluation that platinum is the most suitable material. However, since platinum is weak in its adhesiveness to glass, titanium is inserted between them to increase the adhesiveness. Therefore, it is necessary to make the heater in a two-layer structure.

Thus, the present invention can provide a glass wave guide element and a method of manufacturing the glass wave guide element which can cope with the further increasing multiplicity of wavelength divisional multiplexing communications; and, the waveguide element has the same characteristics as those of the conventional element using an optical fiber and is small in size, and amenable to integration and mass-production.

Although germanium is used as the additive to the core in the described embodiment, the invention is not limited to the use of germanium, since the same effect can be attained by adding an element producing an induced refractive index change to ultraviolet light, such as phosphorus. Further, other methods may be employed as the method of film-forming the under cladding, the core and the over cladding.

As described above, in the glass wave guide element in accordance with the present invention, the core covered with the under cladding and the over cladding of the glass wave guide and the central portion of both claddings in the surrounding portion around the core are formed in a state of being continuously separated along the longitudinal direction of the core from the substrate through a gap, and the core and the surrounding portion around the core are formed in a state of being separated in the width direction of the core from the surrounding portion of both claddings through a gap. Therefore, the element can be easily made small in size and high in integration. Further, it is easy to form the gaps and to remove the thin film using the gaps Therefore, it is possible to provide a glass wave guide element and a method of manufacturing the glass wave guide element which are suitable for mass-production.

What is claimed is:

1. A glass wave guide element comprising a substrate; an under cladding formed on said substrate; a core having a diffraction grating with a spatially periodically changing refractive index along a light transmission direction, said core being formed on said under cladding; an over cladding covering said core; and a heater for changing the Bragg wavelength of said diffraction grating, said heater being arranged in said over cladding, wherein said core and a central portion of both said claddings in a surrounding portion around said core are formed in a state being continuously separated along a longitudinal direction of said core from said substrate through a gap, and said core and said surrounding portion around said core are formed in a state separated in a width direction of said core from a surrounding portion of both said claddings through a gap.

2. A glass wave guide element according to claim 1, in which said heater is formed of a metallic laminated film for changing the temperature of said core, said heater being formed along said core on an upper surface of the over cladding within an area bounded by said gaps; and an opening is provided for irradiating ultraviolet light to produce a spatially periodic change of refractive index in said core, said opening being formed in a central portion of said heater.

3. A glass wave guide element according to claim 2, wherein said heater is formed by a titanium film formed on said over cladding and a platinum film formed on said titanium film.

4. A glass wave guide element according to claim 2, wherein a pad zone of said heater to be wire-bonded is formed of a three-layer film of titanium, platinum and gold, and a heating zone of said heater is a two-layer film formed of titanium and platinum.

* * * * *